United States Patent [19]

Cann

[11] Patent Number: 4,887,336
[45] Date of Patent: Dec. 19, 1989

[54] CONVEYOR BELT CLAMP

[75] Inventor: Robert J. Cann, Chilwell, England

[73] Assignee: Coal Industry (Patents) Limited, London, England

[21] Appl. No.: 260,682

[22] Filed: Oct. 21, 1988

[30] Foreign Application Priority Data

Nov. 5, 1987 [GB] United Kingdom ............... 8725979

[51] Int. Cl.$^4$ .......................... B30B 1/08; F16G 3/00
[52] U.S. Cl. ........................................ 24/37; 24/32; 100/258 A; 100/270
[58] Field of Search ............... 24/37, 31 R, 31 B, 32; 198/854; 474/257; 100/258 A, 270, 93 P

[56] References Cited

U.S. PATENT DOCUMENTS

| 529,364 | 11/1984 | Claudy et al. | 24/32 |
| 1,065,943 | 7/1913 | Hornby | 24/37 |
| 1,414,428 | 5/1922 | McCay | 24/32 |
| 1,812,297 | 8/1931 | Bowlus | 24/37 |
| 4,187,776 | 2/1980 | Schroder | 100/93 P |
| 4,388,860 | 6/1983 | Thies | 100/270 |
| 4,423,674 | 1/1984 | Thies | 100/258 A |

Primary Examiner—Victor N. Sakran
Attorney, Agent, or Firm—James Creighton Wray

[57] ABSTRACT

A conveyor belt clamp is made up of a pair of parallel plates which hold a belt between them. Tension is applied by a tensioning bar which is fixed across arms attached to and projecting outwardly from each plate. A hydraulic ram applies the tension and the plates bow centrally towards the belt to give an even distribution of pressure across its width.

8 Claims, 1 Drawing Sheet

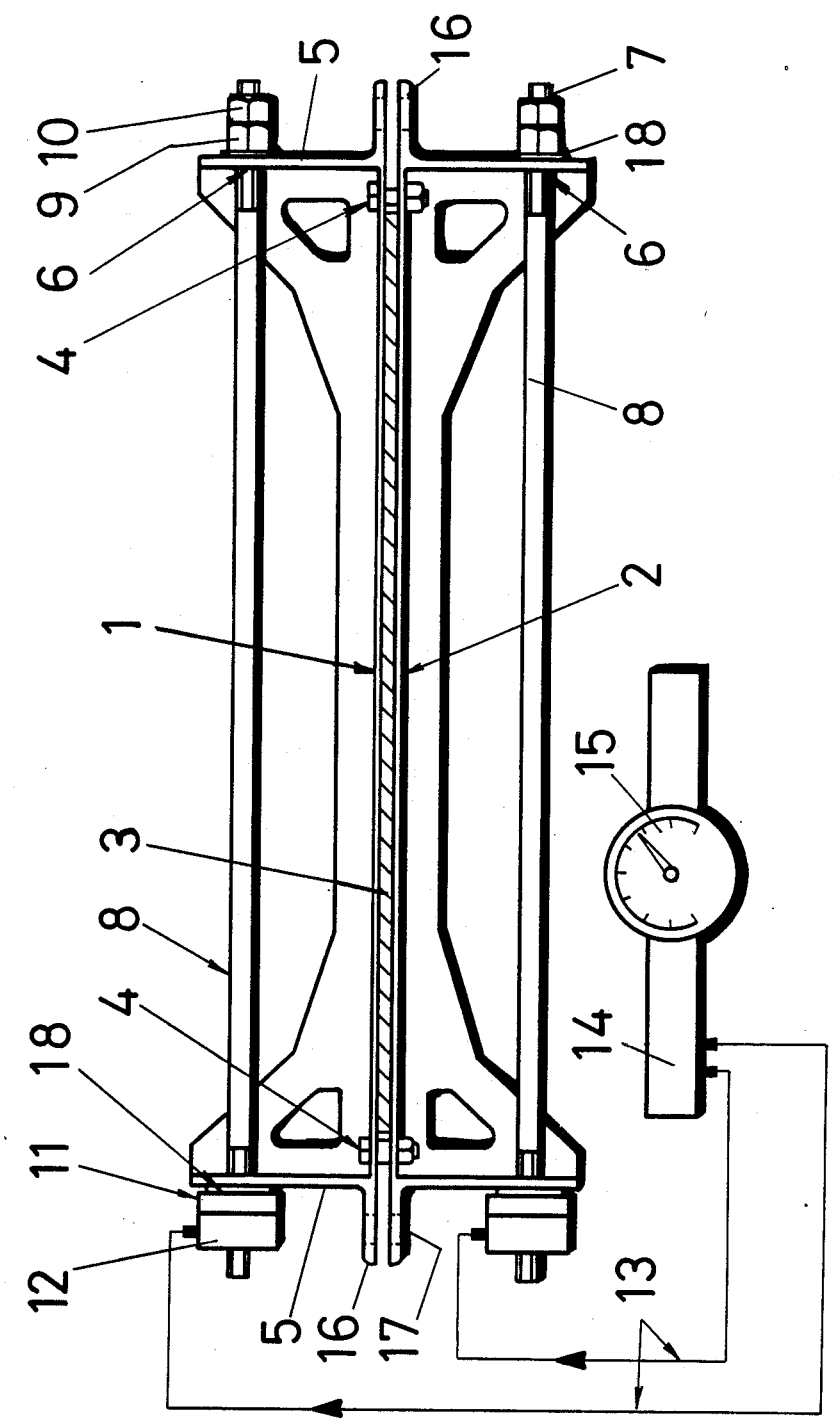

CONVEYOR BELT CLAMP

This invention relates to a conveyor belt clamp and is particularly applicable to clamping conveyor belts during a repair operation.

Many kilometers of conveyor belting are used in mines, quarries and similar installations which convey quantities of particulate material over large distances. The conveyors used generally comprise a reinforced belting which is made up of a central core of a webbing material covered with a rubber or similar outer layer. The conveyor belts are carried over a series of rollers and form a general U shaped trough into which the particular material is deposited and which holds it from one location to another.

Since conveyor belting is used in locations which are environmentally hazardous and which cause the belting to be subjected to shock by sudden loading and wear by the use of abrasive materials the belting can from time to time tear or break. When this happens it is necessary to repair the belt either by joining the two broken ends or to insert a fresh piece of belting at a damaged area. Repair is done by squaring off the two free ends of the belt and applying in one well known technique staples to the ends, interlacing the staples and passing a hinge rod through the interlaced staples. This makes a strong and articulated joint.

While the joint is being made the ends of the belt have to be clamped and pulled together. Unreinforced conveyor belting currently used in tensioned between 50 and 350 kN depending on type and width. There is likely to be a long length of belt to be pulled this can be very heavy and it is necessary that a firm grip is made on the end of the belt and that it is securely held in the correct position while the joint is assembled.

One known form of conveyor belt clamp is shown in U.S. Pat. No. 4609100 which discloses a pair of clamping bars mounted with a belt clamped between them and a hydraulically operating unit mounted above the clamp pressing down at points across the belt giving local pressure points.

Generally conveyor belt clamps to date have had the disadvantage that they have either slipped if there was a great load on them or they have been such as to cause damage to the surface of the belt by too high a load being placed on the belt in the clamping area. The clamps used have normally been of a type where the belt is sandwiched between two beams which are bolted together close to the edges of the belt to trap the belt between them. Because of this the clamping pressure is concentrated on the edges of the belt and sometimes there is little or no pressure at the centre of the belt. The beams are then drawn along the conveyor until the two free ends are jointed.

It is an object of the present invention to provide an improved form of conveyor belt clamp which distributes the pressure over the whole of the width of the belt more evenly and allows good clamping of the belt end without any risk of damaging the surface of the belt. It is also an object to provide an improved method of clamping belt ends during repair or extension of the belt.

According to a first aspect of the present invention a conveyor belt clamp comprises a pair of parallel members adapted to receive a conveyor belt to be clamped between them, securing means for the parallel plate-like members, and tensioning means adapted to apply a tension to at least one of the parallel plate-like members to cause it to bend.

A pair of parallel outwardly projecting arms are located at or adjacent the ends of at least one of the members.

A pair of arms extends from each parallel plate-like member, preferably at right angles to the member, with the tensioning means connected between the free ends of the arms.

The parallel members may be joined by end bolts securing the two members together outside the edges of a belt between the two members.

The tensioning means may comprise a bar which has threaded ends on which nuts are secured and the nuts are adjustable to alter the tension on the bar and hence on the member. In a preferred form of tensioning means a nut is hydraulically tightened to a pre-determined pressure by hydraulic means connected to one end of the tensioning means.

In order to prevent bending stresses being developed in the bar as the plates deflect spherical washers are preferably used in association with the nuts on the tensioning bar.

According to another aspect of the invetion a method of clamping a conveyor belt comprises applying across the width of the belt a clamping member having a pair of parallel members with one member on each side of the belt, securing the members together and applying a tensioning force to the members to cause them to bend and to distribute a clamping pressure relatively evenly across the width of the belt.

In order that the invention may be fully understood a conveyor belt clamp in accordance therewith will now be described by way of example only with reference to the schematic diagram of the accompanying drawing.

Referring now to the drawing the clamp comprises two parallel plates 1, 2 which engage with the surface of a conveyor belt 3 on the inner surfaces of the plates, securing means comprising end bolts 4 hold the two plates 1, 2 together. The plates have upstanding arms 5 each of which has at its free end a hole 6 through which the threaded end 7 of a tensioning bar 8 passes. At one end nuts 9 with locking nuts 10 are secured on the threaded end 7 and at the other end a hydraulic nut 11 is fastened. The hydraulic nut is coupled to a hydraulic ram 12 operated by hydraulic fluid fed over a line 13 from a pump 14 having an indicator dial 15.

The plates 1, 2 each have an extension 16 at their ends beyond the arms 5 and each extension 16 has a hole 17. These holes are for securing the clamps in position to adjacent furniture on the conveyor frame or other suitable location.

Each of the nuts 9 and 11 have spherical washers 18 between them and their abutting surfaces to assist in the bending movement of the plates.

In operation when it is required to join two ends of a conveyor belt a clamp similar to that shown in the FIGURE is applied to each end of the belt. The belt 3 is threaded between the plates 1 and 2 and the end bolts 4 are tightened so that there is a firm grip on the belt. The bolt 9 on the tensioning bar 8 is first tightened and locked with bolt 10 and then the pump 14 is operated to send fluid over line 13 to the hydraulic ram 12 which tensions the bar 8. The bar 8 is loaded to a preset tension which is indicated on the dial 15. As ram 12 is pressurized the offset ends of the arms 5 are drawn together so that the plates 1 and 2 bend in towards the centre towards the belt. When the correct tension has been applied nuts 11 are now up against the ram 12 and the hydraulic pressure is released. Thus, while the clamp is in operation, the nuts 11 maintain the clamping force, rather than the hydraulic system. This bending causes a redistribution of the pressure on the belt and thus applies a more even clamping force over the surface of the belt. Shackles connected to chains or tensioning devices can be applied to the clamp through hole 17 and the two clamped ends of the belt are then drawn together for fixing. Once the ends are fixed the pressure from the pump 14 is applied again so that nuts 11 can be slackened off on tensioning bar 8 and bolts 4 are released to enable the clamp to be removed from the belt.

It will be appreciated that by use of the invention a simple and effective way of redistributing the pressure over the whole width of a belt is achieved and there is less risk of damage to the belt by high point loading at the ends. There is a high degree of control of the amount of pressure applied to the belt by monitoring the pressure in the hydraulic pump 14 so that any accidental risk of surface damage to the belt is minimised.

I claim:

1. A conveyor belt clamp comprising a pair of parallel plate-like members, a pair of parallel outwardly projecting arms located at or adjacent the ends of the plate-like members, securing means for the plate-like members arranged to hold them in use against a conveyor belt to be clamped between them and tensioning means; the tensioning means being connected to at least one of the pair of parallel outwardly projecting arms and being connected parallel to the width of the conveyor belt to apply through the arms a tension to cause the plate-like members to bend towards the other member.

2. A conveyor belt clamp according to claim 1 in which tensioning means are also applied to the pair of parallel outwardly projecting arms of the second plate-like member.

3. A conveyor belt clamp as claimed in claim 1 in which the tensioning means are applied to the free ends of the outwardly projecting arms.

4. A conveyor belt clamp as claimed in claim 1 and including means for providing a tensioning force to the tensioning means.

5. A conveyor belt clamp as claimed in claim 4 wherein the means is hydraulic.

6. A conveyor belt clamp as claimed in claim 1 wherein the tensioning means comprises a tensioning bar having threaded ends projecting through the free ends of the arms and having adjustable nuts secured to the tensioning bar to supply a tensioning force.

7. A conveyor belt clamp as claimed in claim 6 and including spherical washers associated with the nuts on the tensioning bar.

8. A method of using a conveyor belt clamp comprising the steps of:
   (a) threading a conveyor belt between parallel plate-like members of the clamp;
   (b) tightening end bolts of the clamp so as to firmly grip the conveyor belt;
   (c) inserting a tensioning bar parallel to the width of the conveyor belt through outwardly projecting arms of at least one of the plate-like members;
   (d) sliding spherical washers onto either end of the tensioning bar;
   (e) fastening an end nut on one end of the tensioning bar;
   (f) locking the end nut on the tensioning bar with a locking nut;
   (g) fastening a hydraulic nut on the other end of the tensioning bar;
   (h) coupling the hydraulic nut to a hydraulic ram;
   (i) attaching lines from a pump to the hydraulic ram;
   (j) sending fluid from the pump through the lines to the hydraulic ram which tensions the tensioning bar, whereby at least one of the parallel plate-like members bends centrally towards the conveyor belt to distribute a clamping pressure evenly over the width of the conveyor belt.

* * * * *